United States Patent [19]

Tornos Garcia et al.

[11] 4,285,229
[45] Aug. 25, 1981

[54] INTRODUCED IN THE DETECTION OF LEAKAGES OF THE COOLING IN BLAST FURNACE NOZZLES

[75] Inventors: Adolfo Tornos Garcia, Oviedo; Alejandro Felgueroso Ruiz; Aurelio Diaz Fernandez-Raigoso, both of Gijon, all of Spain

[73] Assignee: Empresa Nacional Siderurgica, S.A. (Ensidesa), Oviedo, Spain

[21] Appl. No.: 64,744

[22] Filed: Aug. 8, 1979

[30] Foreign Application Priority Data

Sep. 14, 1978 [ES] Spain .................................. 473.370

[51] Int. Cl.$^3$ .................................................. G01M 3/28
[52] U.S. Cl. ........................................ 73/40; 340/605
[58] Field of Search ............... 73/40, 40.5 R; 340/605

[56] References Cited

U.S. PATENT DOCUMENTS

| | | | |
|---|---|---|---|
| 2,486,280 | 10/1949 | Hausmann | 73/40 X |
| 2,932,187 | 4/1960 | Somers et al. | 73/40 |
| 3,122,668 | 2/1964 | Cuny | 73/40 X |

*Primary Examiner*—Gerald Goldberg
*Assistant Examiner*—Joseph W. Roskos
*Attorney, Agent, or Firm*—Wenderoth, Lind & Ponack

[57] ABSTRACT

Leakage of the cooling liquid in blast furnace nozzles is detected by measuring variations in the differential pressure of the cooling liquid using an electronic information system with the technology normally employed in inductive-type systems and capable of detecting minor liquid leakages which are not detectable with conventional control devices. Detection assemblies are incorporated at the cooling liquid inlet and outlet circuits of the installation. Each detection assembly includes a cylindrical housing surrounding a fixed annular hood having a double wall filled with mercury which serves as a guide for the displacement of a movable hood which is inverted with respect to the fixed hood, and provided with a counterweight and an axially projecting stem, the free end of which incorporates a core of magnetic material housed in the influence zone of the high frequency inductive circuit. The mercury which fills the double wall of the fixed hood maintains the volumes of the cooling liquid in the interior and exterior of both hoods separated and independent. Such liquids penetrate into their respective chambers through ducts provided with corresponding by-pass valves.

14 Claims, 9 Drawing Figures

INTRODUCED IN THE DETECTION OF LEAKAGES OF THE COOLING IN BLAST FURNACE NOZZLES

BACKGROUND AND SUMMARY OF THE INVENTION

The present invention consists of an improved system for the detection of leakages in the cooling system of blast furnace nozzles. This system is structurally better and functions more effectively than those systems presently used for the same purpose.

Blast furnace nozzles direct hot air blasts with temperatures of 1,000° to 1,300° C. into the interior of the furnace. The air blast originates in tuyeres and is directed into ovens, normally numbering three or four. The air is forced by pressure in the tuyeres into an annular compartment from which various collectors depart, the number of which will vary depending on the diameter and capacity of the furnace. These collectors terminate in the nozzles. The mouths of the nozzles are housed in the interior of the furnace and discharge the air blast at a pressure which can vary from about 1.5 $Kgr/cm^2$ to about 3 $Kgr/cm^2$ and at a rate of about 8,000 $Nm^3/h$ to 20,000 $Nm^3/h$ per nozzle, depending on the existing inner volumes. For a better graphic idea of this configuration, FIGS. 1 and 2 are included in the set of drawings accompanying this specification and illustrate characteristic diagrams of a blast furnace installation and of the air collector which communicates with the nozzle. These figures will be discussed in detail later in the specification.

The hot air insufflated through the nozzle acts as combustion air to ignite the fuel oil, which is injected in the furnace, and the coke which is also situated inside the furnace. This operation entails flame temperatures which can reach 2,100° C.

It can clearly be understood that due to the temperatures involved in the blast furnace operation, the interior of the nozzles, due to the contact of the mouth thereof with the interior of the furnace, can also reach very high temperatures. Thus, a cooling system is necessary in order to prevent the materials which comprise the nozzles from melting. Typical nozzles are of varied designs; however, these design variations do not alter their function. All types have cooling jackets with water circulation, and almost all are made of copper alloy with a high thermal conductibility. FIGS. 3, 4, 5 and 6 illustrate a typical configuration of a nozzle associated with a blast furnace. These figures will also be discussed in detail subsequently.

Prior art generally depicts nozzles with a single cooling circuit to prevent them from melting due to the high temperatures associated with a blast furnace operation. Also it should be noted that the nozzles are subjected to substantial erosion due to their contact with high temperature particles during the blast furnace operation. Moreover, the more modern techniques of blast furnace design and operation demand that the blast air be of a higher temperature and under a greater pressure than heretofore required; therefore, the cooling of the nozzles should be more precise, more effective, and, above all, more delicate, inasmuch as a cooling system failure could result in the nozzle being burnt or perforated thereby causing the introduction of cooling water into the furnace which would involve substantial risks. Accordingly, the nozzle cooling techniques underwent significant changes to meet the greater demands placed on these systems due to these necessary increases in blast air temperature and pressure.

One solution adopted is a present day technique which consists of providing the nozzles with two independent cooling circuits. One circuit, that of the mouth, cools the part of the nozzle closest to the furnace. This circuit provides cooling water with a greater velocity and pressure; and therefore, it is separated from the rest of the nozzle cooling system where the other circuit is housed. This other circuit provides cooling water with a pressure and velocity practically identical to the prior art cooling circuits. Should the mouth of the nozzle become perforated, the cooling water in the one circuit should be isolated from this area thereby preventing the water from entering the furnace while the other circuit should continue functioning to cool the nozzle. Therefore, with this technique it is not necessary to stop the furnace in order to change the nozzle which results in important savings in time and thereby increases the productivity, and curtails operating expenses, since a stoppage of the blast furnace is very expensive. Accordingly, with this technique, the nozzle could be changed and repaired only during programmed shutdowns.

As best shown in FIG. 7, the cooling circuit of the mouth is a closed circuit. This is because of the aforementioned requirement of high water pressure and velocity. However, this closed cooling circuit makes direct and immediate observation of the cooling water in each furnace nozzle impossible. Heretofore with prior art systems, water was discharged freely from each nozzle to a collector, thus, by observing the amount of water discharged to the collector, cooling circuit leaks could be detected. With the present day techniques of a closed circuit system this is impossible. Typically, the water of the closed circuit for this type of nozzle is at a rate of 30–40 $m^3/h/nozzle$. Effective operation of this type of closed circuit system is more essential to the proper operation of the furnace than that of older open systems. Also, the risks involved, including explosion, due to the failure of the closed system are greater than the risks involved due to the failure of the open system.

In view of the above, the need to find an effective method for the detection of leakages in these closed circuit systems is critical, and many methods have been devised; the most commonly used system consists of placing a manometer in the circuit of each nozzle with two rapid valves, one in front of the manometer and the nozzle and the other at the back in the water inlet and outlet pipings. Periodically, the valves are closed, isolating the nozzle from the circuit. Once said closing has taken place, the manometer indicates whether there is a leakage of not. However, this inspection by observation is very subjective and rapid since it can only last for a few seconds inasmuch as if the mouth of the nozzle does not contain water it would burn. Even when done quickly, this method is not safe, because if the mouth becomes perforated after the inspection has been made, water will continuously enter the furnace until a new observation takes place. Furthermore, other systems of observation by means of equipment situated in and around the surroundings of a furnace in use is not recommended. Also, often times the indications of manometers are not accurate or precise, thus making their reliability questionable. In short, other more reliable and, especially, more rapid processes should be devised.

In this light, a present day technique uses another method consisting of the detection of $H_2$ in the throat of the furnace. This method, besides being slow due to the reaction of the furnace itself, cannot indicate which nozzle produces the water leakage. The continuous analysis of $H_2$ can manifest not only water leakages in the nozzles, but leakages in jackets and slabs, as well as variations in the consumption of fuel oil. These manifestations indicate that this method is one of confirmation not of direct detection. Consequently, the need to find a truly effective method continues. However, certain parameters of those closed circuit systems necessary for their proper operation have been established. Some of the more interesting parameters are the following:

Substantially Zero Deviation. If an average value of the cooling flow rate at the mouth of the nozzle is Q $M^3$, an instantaneous value of the flow rate should be within $\pm 1$ $m^3$ of Q $M^3$.

Repeatability of the measurement. This condition is much more important than the preciseness of the measurement.

At present no known system complies with the first condition. Therefore, the lowest detectable threshold of the magnitude of leakage which said systems can detect does not satisfy the needs of blast furnace operators. The majority of the systems presently being experimented with in most blast furnaces are experiencing substantial problems. The following systems are some current examples:

Propeller meters. These cause relatively high losses in charges which consequently result in the need for using pumps having a greater pressure, a fact which results in a greater initial cost and a greater operating cost.

Measurement of variations in ultrasound fields or magnetic fields. The contamination of the water (oxides, gas bubbles, etc.) affects the apparatus, thus falsifying the measurement. On the other hand, this very delicate apparatus should be mounted on the pipe itself, and to prevent the rapid deterioration thereof under extreme environmental conditions in the proximity of the furnace, the pipe should be positioned to allow the apparatus to be situated in conditions premises, but this increases the initial installation cost.

Measurement of the differential pressure with a venturi or diaphragm. The existing systems which use this principle do not comply with the aforementioned condition of substantially zero deviation.

The improvements introduced by the present invention for the detection of leakages in the cooling liquid system involve the use of a detector which corresponds to those utilized by the systems which measure the variations in the differential pressure of the liquid. This improved detector system eliminates the disadvantages mentioned with respect to the other presently existing solutions and presents, when compared therewith, the following advantages:

(a) It has a remarkable substantially zero deviation which permits it to detect leakages in the range of 0.2%;

(b) The measurements are completely repetitive due to the peculiar design of the apparatus included in the invention;

(c) The equipment, which should be situated directly in the pipes, is very sound and could, therefore, be installed in the blast furnace without any need of special premises. On the other hand, the electronic equipment incorporated in the invention is directly positioned in the central control panel of the furnace and is, therefore, completely safe and protected, and it is connected to the mechanical equipment by conductor cables which are readily installed and protected;

(d) The measurements obtained with the present invention are not falsified by the minor impurities which the water may contain; and (e) The assembly is not affected by the pulses of the hydraulic circuit.

This invention which has the aforementioned advantages is a system which, basically, observes variations of an electromagnetic field, produced by a ferrite, integrated into an assembly which incorporates two hoods for detecting the differential pressure between liquids taken from two points within the cooling system. The variations in the field are produced in a high-frequency current feed coil as a function of the variations in said differential pressure. The signal observed in said coil is converted into a modulated signal, preferably of 0-20 mA, which, subsequently, is directed to an indicator where the alarm and recording system is situated. Use is made of a technique normally employed in the inductive-type systems to process the information coming from the high-frequency coil. These conventional recording, alarm, and information processing systems are familiar to those skilled in the art.

To complement the description and for a better understanding of the characteristics of the invention, a set of drawings accompanies this specification and forms an integral part thereof wherein the invention is illustrated. Thus, these drawings aid in describing the preferred embodiment, while in no way serve to limit the scope of the invention.

DETAILED DESCRIPTION OF THE INVENTION

Figure 8:
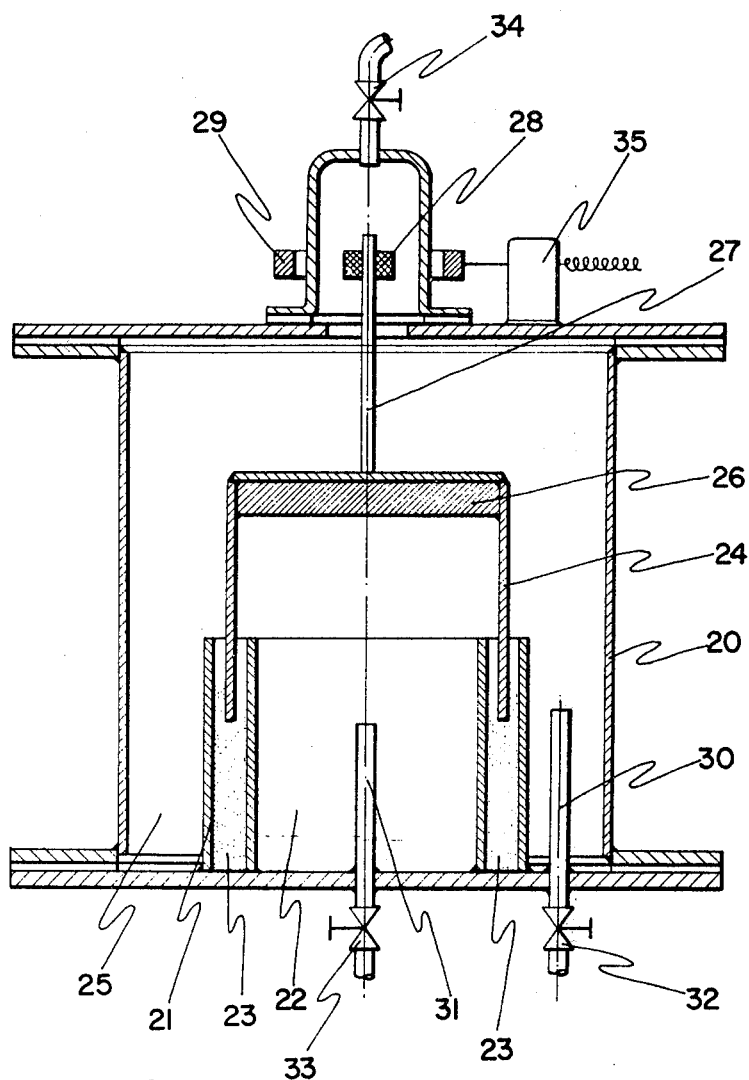
FIG. 8 is a vertical section view of the assembly in the present invention which acts as the means for detecting the leakages of the cooling liquid in the blast furnace nozzles.
Figure 9:
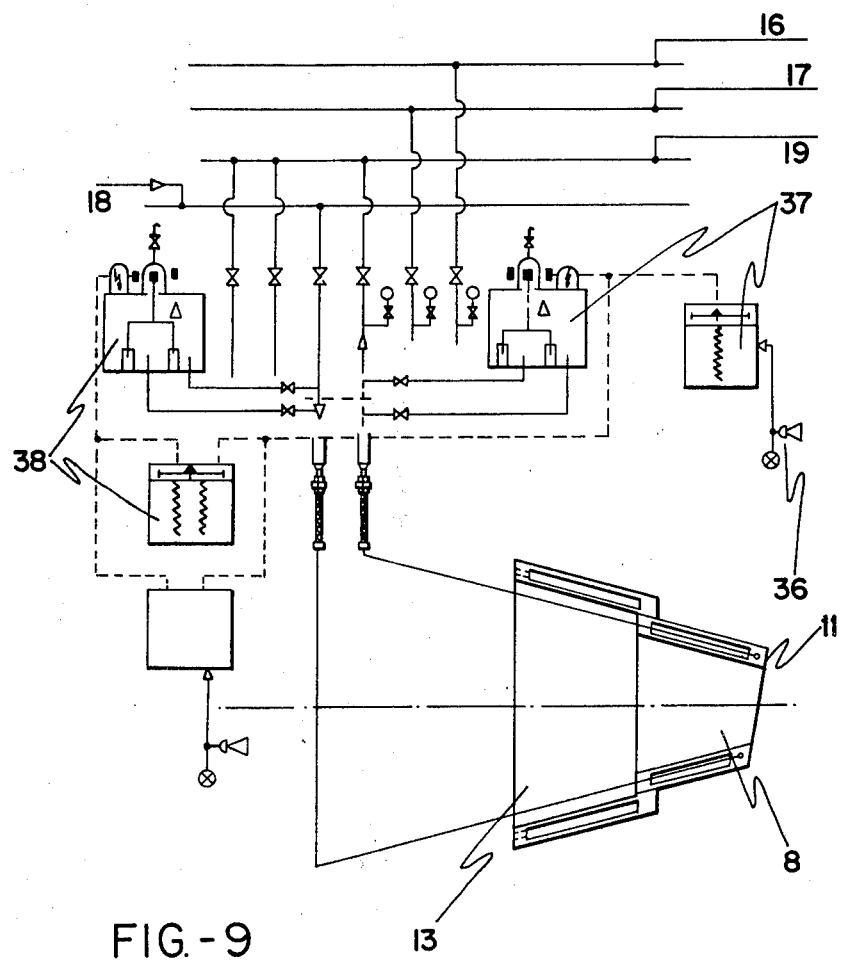
FIG. 9 is a diagram of the cooling system of a blast furnace like that illustrated in FIG. 7 but includes two of the detecting assemblies of the invention.

In view of the previously mentioned figures, especially with respect to FIGS. 8 and 9, the improvements introduced in the detection of leakages of the cooling liquid in blast furnace nozzles reside in the incorporating into the cooling installation at least one of the assemblies schematically illustrated in the aforementioned FIG. 8. With this assembly or measuring instrument, it is possible to detect minor leakage of the cooling liquid which can occur in blast furnace nozzles and which are not detectable with the presently existing conventional control apparatus.

Referring to FIG. 8, the assembly in question comprises a cylindrical housing 20, situated in the interior of which is an annular hood 21, with a double wall, the interior thereof forms a completely hermetically sealed inner chamber 22, as described. The walls forming the annular hood 21 are filled with mercury 23 which serves as a guide for the movement of another hood 24, which is inverted with respect to hood 21, the wall thereof is housed between those of hood 21. At the same time the mercury acts as a seal between the chamber 22 and the chamber 25 which surrounds the assembly of the two hoods. Hood 24, in turn, is provided with a counterweight 26 and a stem 27, axially and upwardly arranged, the end zone thereof includes a ferrite core 28 arranged in the influence area of an inductive coil or circuit 29 which is fed with a high-frequency current.

The chambers 25 and 22 communicate, respectively, with the cooling installation by means of ducts 30 and 31 with the interposition of corresponding valves 32 and 33. Likewise, there is a drip valve 34.

According to this structure, the variations in the differential pressure existing in the liquids which occupy the chambers 25 and 22 are converted into consequent displacements of the hood 24. These displacements produce variations in the electromagnetic field existing in the inductive circuit 29 due to the relative displacement of the ferrite core 28. These field variations are transmitted to a device 35 (FIG. 8) which converts them into a modular electric signal capable of activating optical or acoustic alarm devices 36 and recording devices 37 (FIG. 9).

The most important functions of the mercury 23 are herein mentioned. The mercury 23 acts as a sealing and separating element for the two chambers 22 and 25. In addition, the mercury constitutes a viscous support element for the hood 24 while preventing the pressure differentials existing between the chambers from being balanced by leakages which could occur if another sealing means was utilized.

Figure 1:
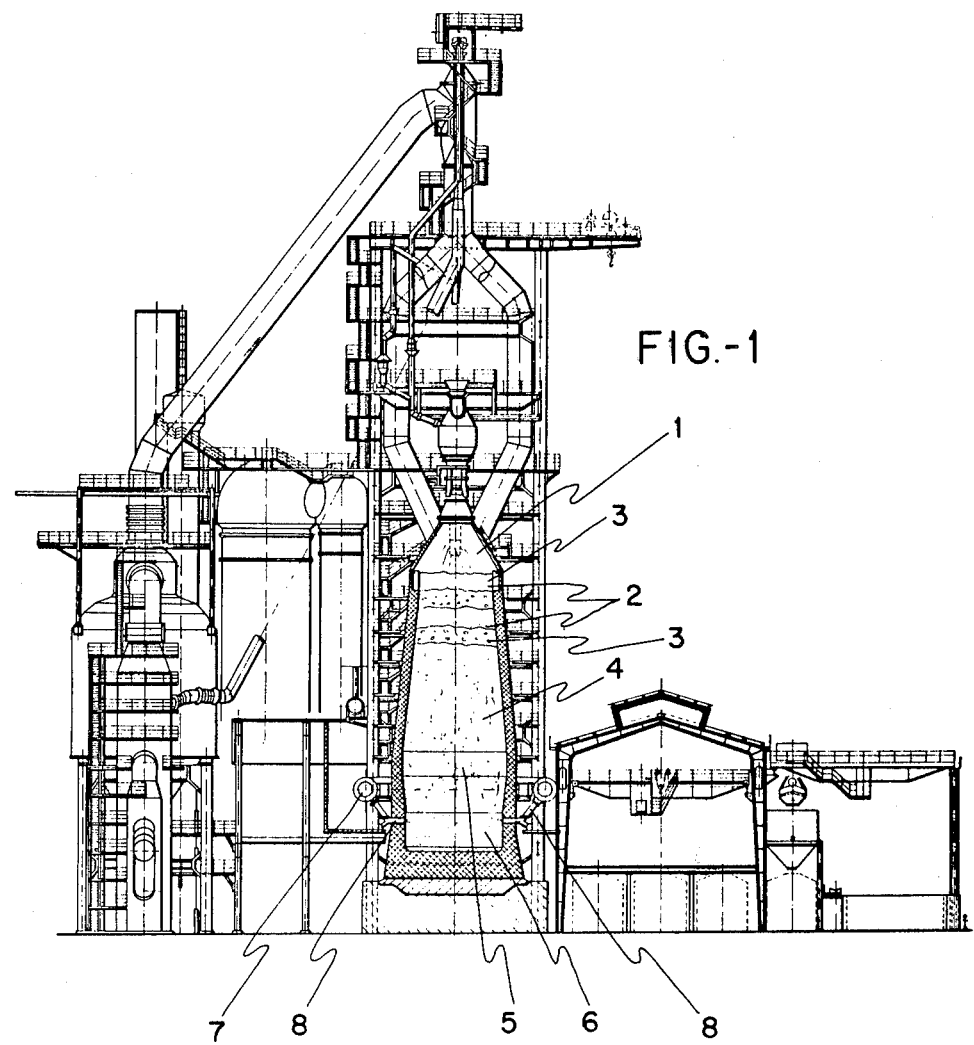
FIG. 1 is an elevated view of a characteristic blast furnace installation representing the following: 1—the loading zone of the furnace; 2—the layers of ore being introduced therein; 3—the layers of coke; 4—the zone where the ore and coke are mixed; 5—the zone where the material is melted and 6—the lower part of the furnace in question where the melted ore is obtained. 7 represents the air collectors which insufflate air through the mouth of nozzles 8.
Figure 2:
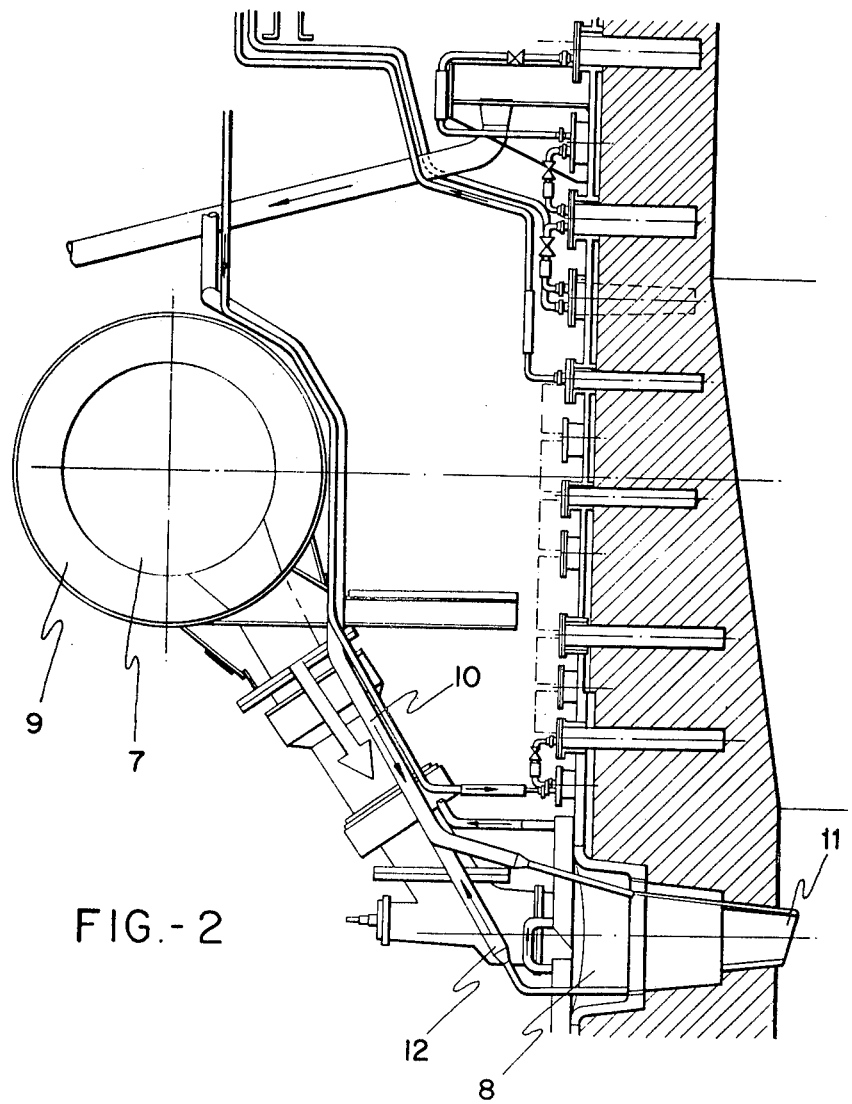
FIG. 2 is an elevated view of a portion of the blast furnace installation representing the air blast collector 7, surrounded by the refractory 9 and the cold water inlet piping 10 for cooling the mouth 11 of the nozzle 8. The cooling liquid return manifold 12 is likewise represented.
Figure 3:
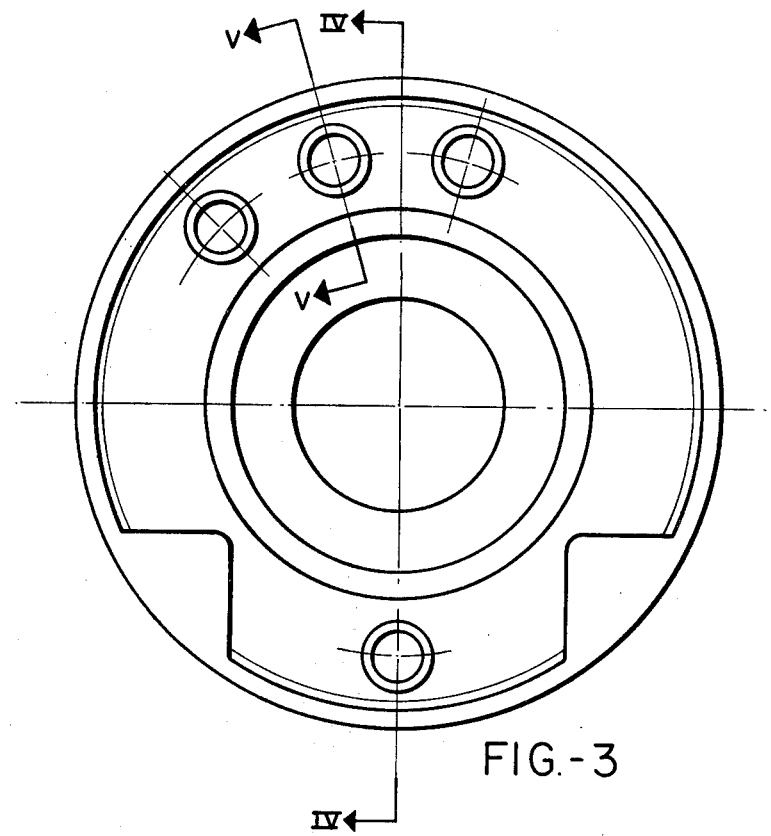
FIG. 3 is an elevated view of the nozzle 8, representing the various ducts for the circulation of the cooling liquid.
Figure 6:
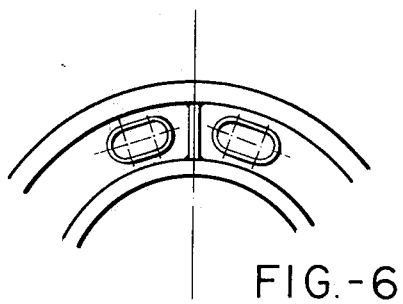
FIG. 6 is a sectional view of the nozzle along VI—VI of FIG. 5.
Figure 4:
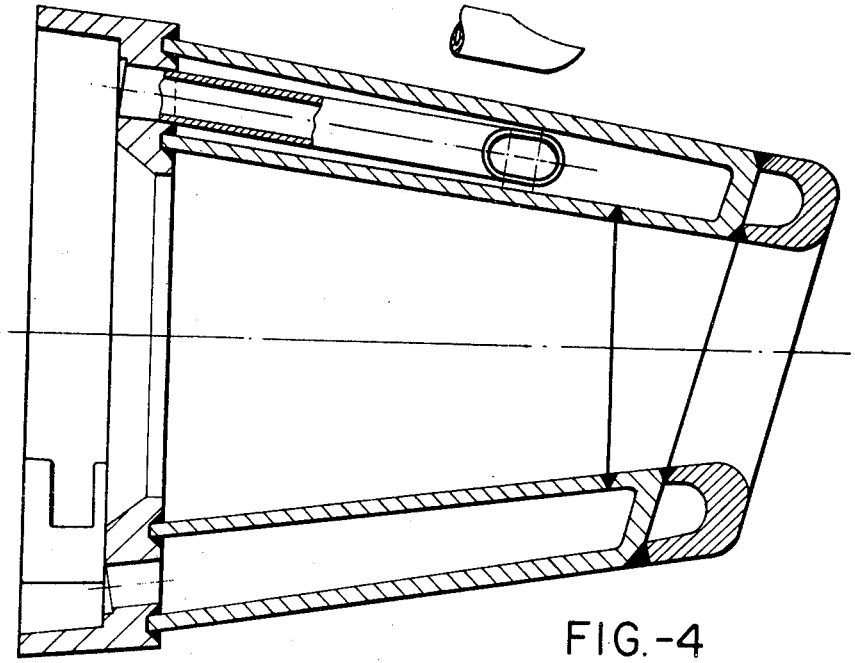
FIG. 4 is a sectional view along IV—IV of FIG. 3 of a blast furnace nozzle.
Figure 5:
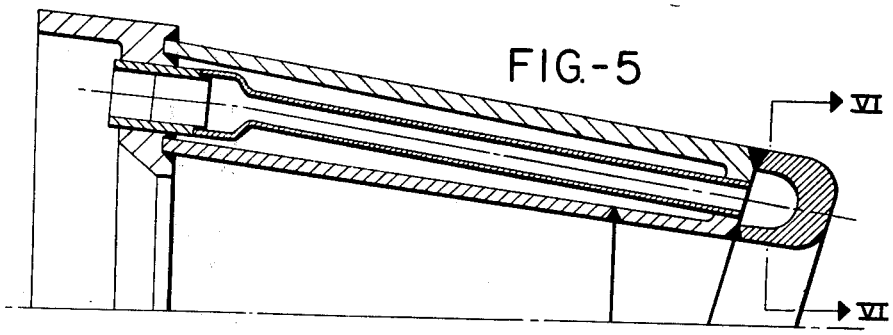
FIG. 5 is a sectional view along V—V of FIG. 3.
Figure 7:
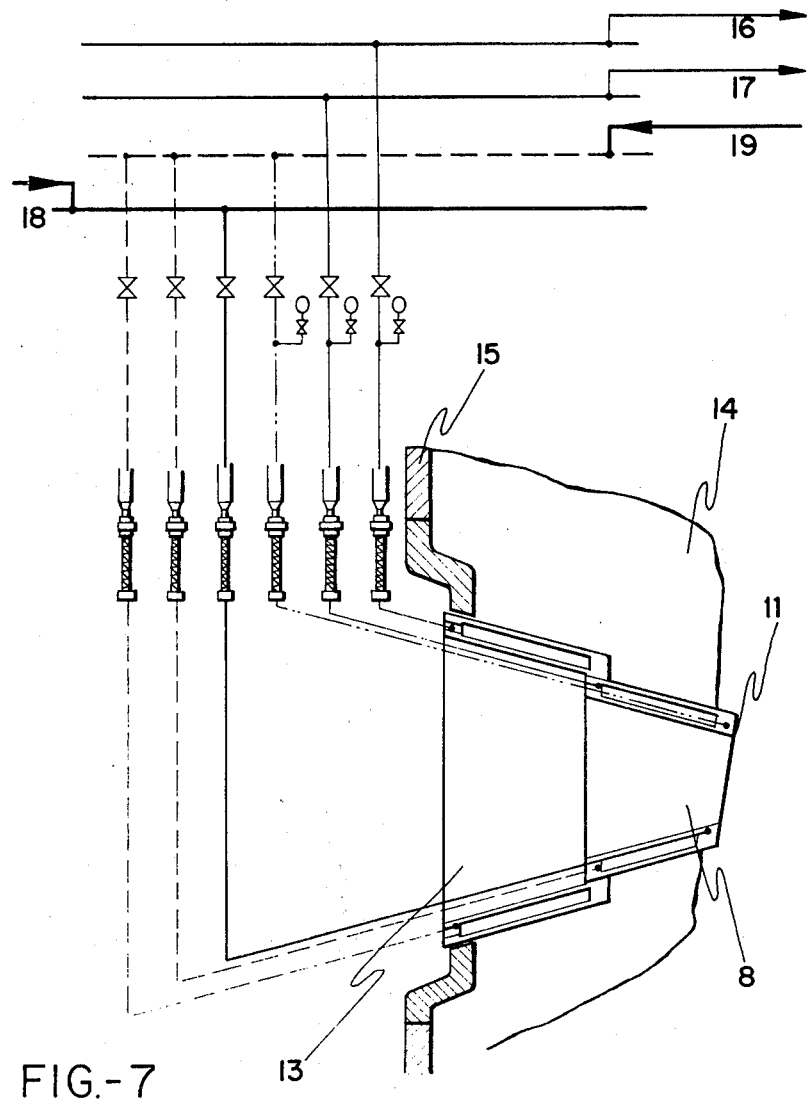
FIG. 7 is a diagram of the cooling system of the blast furnace nozzle. This diagram represents the nozzle 8 and the widest part thereof 13, the refractory 14 which surrounds the blast furnace, and the housing 15 of the furnace. Lines 16 and 17 represent, respectively, the hot water return collectors coming from the widest part of the nozzle 13 and the bodies of the nozzle 8. Line 18 represents the arrival of cold water at the mouth 11 of the nozzle 8 and line 19 the arrival of additional cold water at the bodies of the nozzle and the widest part thereof.

The operative housing of this device can best be seen in FIG. 9 wherein the conventional cooling system represented in FIG. 7 has been modified by including detecting assemblies 37 and 38. One of those assemblies is housed in the inlet cooling circuit while the other is housed in the outlet cooling circuit. The measurements taken by these detecting assemblies can be compared using conventional methods, and if differences exist therebetween, the contemplated alarm means will be activated.

However, if the installation insures a cooling circuit having a constant flow, the inlet detecting assembly could be eliminated because a single detecting assembly in the outlet circuit would be sufficient.

Consequently, the invention comprises a detection system which includes a very sound assembly which permits it to be situated close to the blast furnace without experiencing problems of heating or deterioration, a fact which differentiates it from the majority of the systems conventionally used. Additionally, the novel features of the invention obviate errors of measurement in the detection system caused by the normal pulses of the cooling circuit, resulting in a detection system with such precision that it is capable of detecting liquid leakages lower than 0.2%.

Finally, the detection system of the invention, due to its simple construction, obviates the need of constant maintenance thereto, since the device included therein, once set, tends to remain stable and, therefore, capable of almost indefinite use.

We claim:

1. A device for the detection of leakages in a fluid system and which functions in response to changes in the differential pressure within the system, said device including a detection assembly, said assembly comprising:

a cylindrical housing having therein a fixed annular hood and a relatively movable hood, said fixed hood having a double side wall, a first wall of said double side wall being spaced radially outward from a second wall of said double side wall, said first and second walls defining therebetween an annular space, said movable hood being inverted with respect to said fixed hood and having an annular wall which is movably positioned in said annular space;

an inner chamber defined by the interior space of said hoods;

an outer chamber defined by a space between the exterior of said hoods and the interior of said housing;

a first duct means for communicating said inner chamber with a fluid system;

a second duct means for communicating said outer chamber with a fluid system;

an inductive electronic circuit for producing an electromagnetic field and an electronic signal, said circuit having a coil and a movable ferrite core whereby the displacement of said core causes a variation in said field, said electronic signal being varied in response to said field variation;

said movable hood being axially movable in response to a change in the pressure differential between said chambers;

an axially projecting stem having two ends, one of said two ends being connected to said movable hoods, the other one of said two ends being connected to said ferrite core;

said annular space containing mercury which acts to substantially seal said inner chamber from said outer chamber and to guide said annular wall in its movement; and an electronic means connected to said inductive electronic circuit for receiving said electronic signal therefrom and generating an output signal, said output signal being responsive to said electronic signal variation.

2. A device as claimed in claim 1, further comprising alarm means connected to said electronic means for receiving said output signal thereform and activated in response to a given said output signal.

3. A device as claimed in claim 1, wherein said first and second duct means have therein bypass valves.

4. A device as claimed in claim 1, wherein said inductive electronic circuit comprises a high-frequency feed coil for processing said electromagnetic field variation.

5. A device as claimed in claim 1, further comprising recording means connected to said electronic means for receiving said output signal therefrom and which records pressure differentials in response to said output signal.

6. A device as claimed in claim 1, further comprising counterweight means attached to said movable hood.

7. In a liquid cooling system of a blast furnace nozzle wherein the system comprises an inlet and an outlet for cooling liquid, the improvement comprising a device for the detection of leakages in said system and which functions in response to changes in the differential pressure within said system, said device including a detection assembly, said assembly comprising:
- a cylindrical housing having therein a fixed annular hood and a relatively movable hood, said fixed hood having a double side wall, a first wall of said double side wall being spaced radially outward from a second wall of said double side wall, said first and second walls defining therebetween an annular space, said movable hood being inverted with respect to said fixed hood and having an annular wall which is movably positioned in said annular space;
- an inner chamber defined by the interior space of said hoods;
- an outer chamber defined by a space between the exterior of said hoods and the interior of said housing;
- a first duct means for communicating said inner chamber with a fluid system;
- a second duct means for communicating said outer chamber with a fluid system;
- an inductive electronic circuit for producing an electromagnetic field and an electronic signal, said circuit having a coil and a movable ferrite core whereby the displacement of said core causes a variation in said field, said electronic signal being varied in response to said field variation;
- said movable hood being axially movable in response to a change in the pressure differential between said chambers;
- an axially projecting stem having two ends, one of said two ends being connected to said movable hood, the other one of said two ends being connected to said ferrite core;
- said annular space containing mercury which acts to substantially seal said inner chamber from said outer chamber and to guide said annular wall in its movement; and
- an electronic means connected to said inductive electronic circuit for receiving said electronic signal therefrom and generating an output signal, said output signal being responsive to said electronic signal variation.

8. A device as claimed in claim 7, further comprising alarm means connected to said electronic means for receiving said output signal therefrom and activated in response to a given said output signal.

9. A device as claimed in claim 7, further comprising counterweight means attached to said movable hood.

10. A device as claimed in claim 7, wherein said first and second duct means have therein bypass valves.

11. A device as claimed in claim 7, wherein said detection assembly communicates with said cooling system outlet.

12. A device as claimed in claim 7, having two detection assemblies when said system does not have a substantially constant cooling liquid flow rate, one of said assemblies communicates with said cooling inlet, and the other one of said assemblies communicates with said cooling system outlet.

13. A device as claimed in claim 7, wherein said inductive circuit comprises a high-frequency feed coil for processing said electromagnetic field variation.

14. A device as claimed in claim 7, further comprising recording means connected to said electronic means for receiving said output signal therefrom and which records pressure differentials in response to said output signal.

* * * * *